(12) United States Patent
Elenbaas

(10) Patent No.: US 9,568,702 B2
(45) Date of Patent: Feb. 14, 2017

(54) ARRANGEMENT FOR TERMINATING A TRANSMISSION CABLE

(71) Applicant: TE Connectivity Nederland B.V., 'S-Hertogenbosch (NL)

(72) Inventor: Jacco Elenbaas, Heyningen (NL)

(73) Assignee: TE Connectivity Nederland B.V., 'S-Hertogenbosch (NL)

( * ) Notice: Subject to any disclaimer, the term of this patent is extended or adjusted under 35 U.S.C. 154(b) by 0 days.

(21) Appl. No.: 14/737,449

(22) Filed: Jun. 11, 2015

(65) Prior Publication Data

US 2015/0277076 A1    Oct. 1, 2015

Related U.S. Application Data

(63) Continuation of application No. 14/018,305, filed on Sep. 4, 2013, now Pat. No. 9,057,837.

(30) Foreign Application Priority Data

Sep. 5, 2012  (EP) .................................... 12183227

(51) Int. Cl.
*G02B 6/44* (2006.01)
*H02G 15/076* (2006.01)
*G02B 6/24* (2006.01)
*G02B 6/38* (2006.01)

(52) U.S. Cl.
CPC ............. *G02B 6/4477* (2013.01); *G02B 6/241* (2013.01); *G02B 6/387* (2013.01); *G02B 6/3817* (2013.01); *G02B 6/3857* (2013.01); *G02B 6/3871* (2013.01); *G02B 6/4434* (2013.01); *H02G 15/076* (2013.01)

(58) Field of Classification Search
CPC .... G02B 6/4471; G02B 6/4477; H02G 15/046
See application file for complete search history.

(56) References Cited

U.S. PATENT DOCUMENTS

| 5,598,500 A * | 1/1997 | Crespel ................ G02B 6/4471 385/100 |
| 9,182,564 B2 * | 11/2015 | Strasser ............... G02B 6/4471 |

* cited by examiner

*Primary Examiner* — Omar R Rojas
(74) *Attorney, Agent, or Firm* — Faegre Baker Daniels LLP

(57) ABSTRACT

The present invention relates to an end cap for terminating a transmission cable containing at least one transmission line, the end cap comprising at least one lead-through opening for guiding the at least one line from a rear side to a front side of the end cap. Further, the invention relates to a terminating arrangement terminating a transmission cable containing at least one transmission line. Moreover, the invention relates to a kit for a terminating arrangement for terminating a transmission cable. In order to facilitate the termination of a transmission cable, the present invention provides that a passage extending from the rear side to the front side is formed at the end cap, the passage being adapted for accommodating a central strength member of the cable.

19 Claims, 3 Drawing Sheets

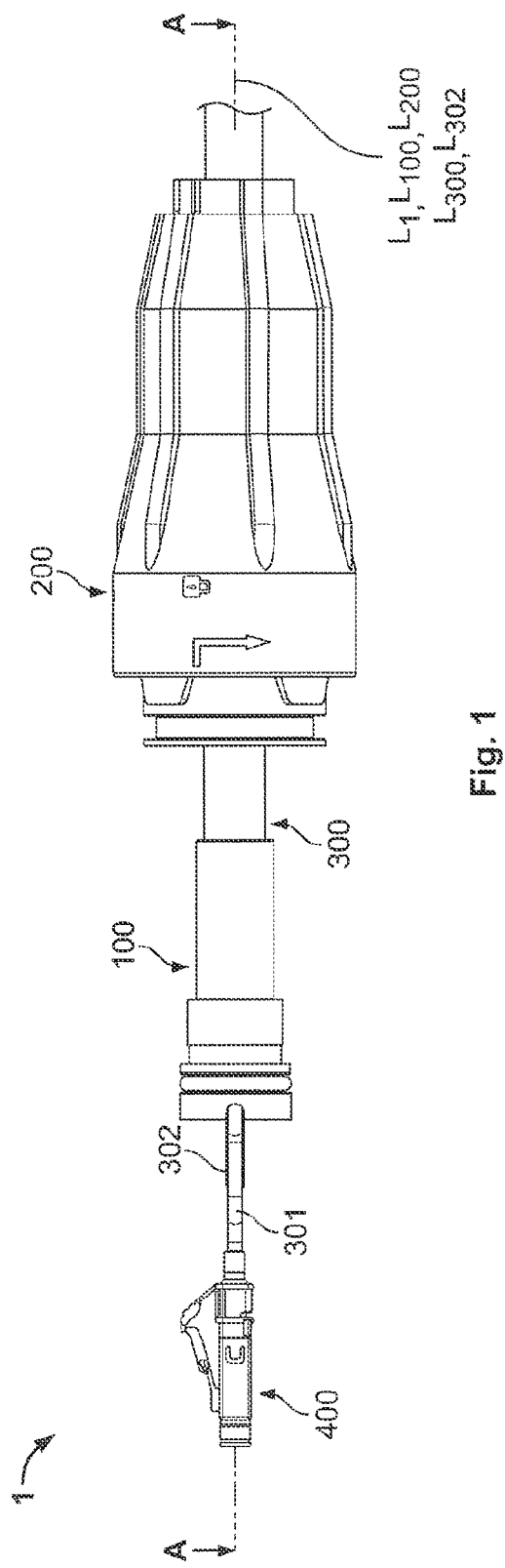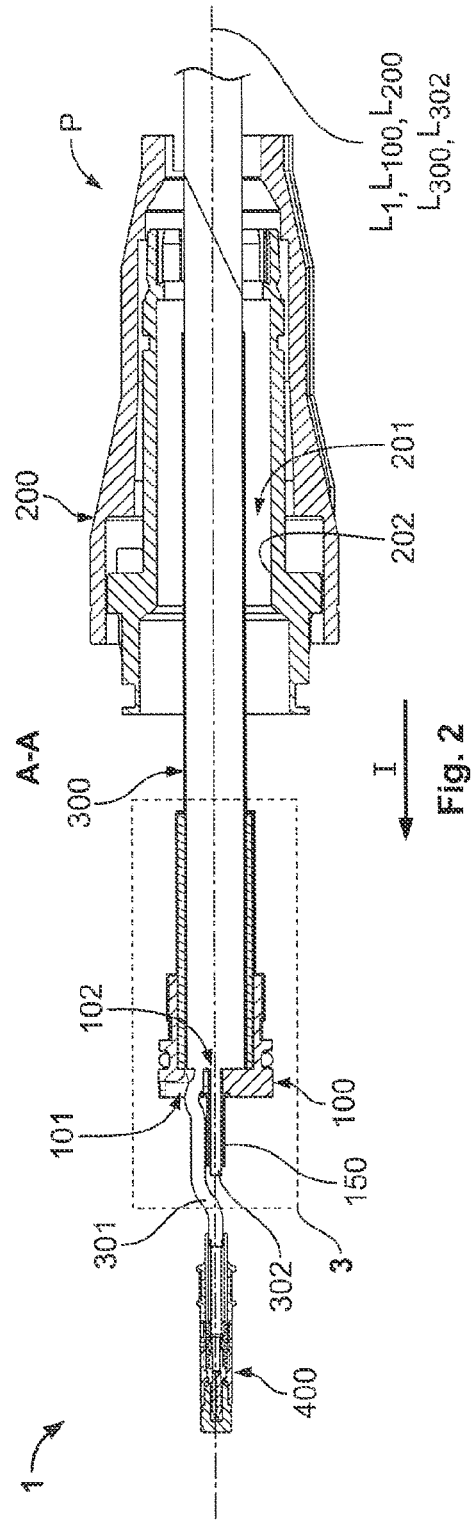

ARRANGEMENT FOR TERMINATING A TRANSMISSION CABLE

RELATED CASES

This application is a continuation application of Ser. No. 14/018,305 filed on Sep. 4, 2013, which in turn claims priority to European Patent Application 12183227.3 filed on Sep. 5, 2012, the subject matter of each being incorporated herein by reference.

BACKGROUND OF THE DISCLOSURE

The present invention relates to a terminating arrangement for terminating a transmission cable containing at least one transmission line.

Terminating arrangements are known from the prior art. The end caps constitute terminating members which facilitate the affixing of an end section of a cable, e.g. in an enclosure, and the guiding of at least one line so that it may be handled and e.g. provided with an optical fibre connector.

For example, the cable may be an optical fibre cable and the transmission line may be an optical fibre. Optical fibres may come as units comprising a fibre element with several individual fibres. The fibres may be bundled to bundles comprising several fibres. Such a bundle or several bundles may be accommodated within a cable. As the fibres themselves are rather long and thin and therefore prone to damage, e.g. by snapping and cracking, it is desired to provide a strain relief in order to eliminate any stresses which could act on the fibres themselves.

According to the prior art, strain relief is commonly achieved in that the layer of Kevlar surrounding each line, e.g. fibre or bundle of fibres, is affixed to the end cap or terminating member. Alternatively, cables with a central strength member in the form of a rod running centrally through the cable may be used. Then, instead of the layer of Kevlar, the strength member is fixed to a terminating member or enclosure. Additionally, the line has to be affixed within the enclosure, e.g. with the help of additional means such as adapters. In other words, two separate actions are necessary for terminating the cable according to the prior art. Hence, both when using the Kevlar layer surrounding the line or optical fibres and the central rod as strength members, terminating the cable so that strain relief is achieved is cumbersome and time-consuming.

In view of the disadvantages arising from the possibilities for terminating an optical fibre cable according to the prior art as mentioned above, it is an object of the present invention to facilitate and expedite the procedure of terminating an optical fibre cable while providing strain relief.

This object is achieved according to the invention for the initially mentioned end cap in that the end cap is provided with a passage extending from the rear side to the front side, the passage being adapted for accommodating a central strength member of the cable. In other words, the end cap may constitute a terminating member or a terminating member may be formed as an end cap, wherein the passage provides a channel which is offset at least in a radial direction of the end cap with respect to the lead-through opening.

For the initially mentioned terminating arrangement, the object is achieved in that at least one end cap according to the present invention is applied to the cable, wherein the at least one line extends through the lead-through opening and the strength member of the cable extends through the passage of the end cap.

For a kit mentioned in the beginning of the description, the object is achieved in that the kit comprises at least one end cap according to the present invention.

These solutions have the decisive advantage over the prior art that, on the one hand, the end cap may accommodate and protect an end section of the cable as well as the line and, on the other hand, may accommodate the strength member so that strain relief is provided. The end cap may be easily applied to the cable and the strength member by sliding the end cap over the cable while leading the line and the strength member through the through-opening and the passage, respectively. Then, the end cap may be fixed to an enclosure, thus serving as an adapter for mounting the strength member and the line to the enclosure in a single step.

Further, by the inventive solution to the object, any additional cable jackets and overmoulds for securing as well as protecting the end section of the cable may be omitted. Retention forces for securing the end cap and providing strain relief may be transferred from the section of the strength member protruding from the front side via the end cap to the outer circumference of the cable arranged at the rear side. Hence, the retention forces of the strength member are transferred to the outside of the cable at a position where normally a cable jacket is fixed. This enables the solution according to the present invention to be applied also to standard cable glands which are commonly used in field install kits.

The above-mentioned solutions according to the present invention may be combined in any way with any one of the following advantageous embodiments of the present invention respectively and thus further improved.

SUMMARY OF THE DISCLOSURE

According to a first possible further embodiment, towards the front face of the end cap, the lead-through opening may be provided with a curvature so that the lead-through opening at least partially extends radially away from the passage. Additionally or alternatively, the lead-through opening may widen funnel-like towards the front face. As a further additional or alternative embodiment, a radial width of the lead-through opening may increase towards the front face. In other words, an outlet of the lead-through opening at the front face may be bigger than an inlet of the lead-through opening at the rear face. All these embodiments have in common that the at least one line may be freely moveable, especially in the area of the front face of the end cap. This enables the at least one line to be handled and arranged separately and at a certain distance from the strength member, which reduces the risk of damaging the at least one line when tools are applied to the strength member.

The passage may end behind the lead-through opening in an insertion direction for inserting the strength member into the passage. In other words, the passage may extend beyond the lead-through opening at the front side in an insertion direction for inserting the at least one line and strength member into the end cap. Thereby, the at least one line may be folded or bent away from the strength member before the area where the strength member exits the passage, which facilitates the handling of the strength member and applying of any tools to the strength member right where it exits the passage.

On the front end of the end cap, the passage may lead into a socket adapted for at least partially accommodating a ferrule to be crimped to the strength member. The socket may provide a base for supporting the ferrule at the end cap. By applying the ferrule, the end cap may be easily fixed on the strength member and/or jammed between the strength member and an end section of the cable. Alternatively, any fixing means may be applied to the strength member and/or accommodated in the socket. The fixing means may be any adhesive applied to the strength member, a deformation zone formed at the strength member and/or any nut, bolt, pin, split pin or alike, which may be used for transferring a retention force from the strength member to the end cap and in particular to the front side, so that the retention force may be transferred by the end cap to the outer circumference of the cable, i.e. to a sheath of the cable.

The socket may protrude from the front side. In other words, the socket may jut above the front side. Thereby, the passage may be easily extended in the insertion direction with respect to the lead-through opening. The socket may be provided with a rim circumferentially surrounding a bottom of the socket. The rim may help to laterally stabilize a fixing means, e.g. a ferrule applied to the strength member. Further, a height of the rim measured in parallel to the insertion direction may exceed a thickness of a rim or collar formed at the ferrule so that any tools, such as a crimp tool or a crimping tong may abut the rim of the socket without damaging the collar of the ferrule. Thereby, the tools may be easily aligned with a front face of the collar of the ferrule and may be rapidly as well as precisely applied to a tubular section of the ferrule to be crimped to the strength member.

The socket may be supported by at least one web extending radially away from the socket. The web may laterally support the socket. The web may merge with the socket. A number of webs may radially extend away from the socket. Thereby, the socket may be stabilized and at the same time protected in that the front sides of the web may serve as guidances along which a crimping tool may be guided when being applied to the ferrule to be crimped to the strength member exiting the passage at the socket.

The rear side of the end cap may be provided with a receptacle adapted for encompassing an end section of the cable. In other words, an end section of the cable may be accommodated within the receptacle. Thereby, the end section of the cable may be held and centered at the end cap and further protected against harmful environmental impacts as well as kinking.

In a projection along a longitudinal direction of the end cap, the passage and the receptacle may be arranged concentrically with respect to each other. In other words, central axes of the passage and the receptacle may be superimposed by each other so that especially a strength member running along a central axis of the cable may be easily inserted into the passage when inserting the end section of the cable into the socket while the strength member protrudes from the end section in the insertion direction.

The receptacle may comprise a bushing adapted to encompass an outer circumference of the cable. The bushing may be formed of metal such as phosphor bronze so that it is hard and rugged in order to protect the end section of the cable. Further, the bushing may be crimped to the cable. The receptacle may hold the bushing and/or at least encompass the bushing. The bushing may also be integrally formed with the end cap which may be formed of plastic, e.g. as an injection-moulded part.

A collar may circumferentially surround the rear face and may protrude from the rear face. Any webs extending radially away from the socket may merge with the collar. This helps to further stabilize the webs, protect the outlet opening of the lead-through opening as well as to guide any tools applied to the strength member, fixing means and/or a ferrule to be crimped to the strength member.

The collar may be provided with at least one gap in the vicinity of the at least one lead-through opening. The lead-through opening may be curved such that it at least partially extends towards the gap. Thereby, the at least one line may be curved and bent so that it extends through the gap and any tools applied to the strength member or a ferrule to be crimped thereto may safely move past the at least one line, which may be guided through the gap.

For a terminating arrangement, the solution may be further improved in that a ferrule is crimped to an outer section of the strength member extending beyond the front side of the end cap. Thereby, the end cap may be jammed between the bushing and/or cable at the rear side of the end cap and the fixing means, e.g. the ferrule, at the front side of the end cap. A rim or collar formed at the ferrule may provide an abutment face in order to support the ferrule at the front side and/or a bottom of a socket provided at the front side for supporting the ferrule.

The invention will be described in more detail by way of example hereinafter with reference to the accompanying drawings, which illustrate advantageous embodiments. The described embodiments are only possible configurations in which the individual features may, however, as described above, be implemented independently of each other or be omitted. Corresponding elements illustrated in the drawings are provided with the same reference signs. Parts of the description relating to the same elements in different drawings are omitted.

BRIEF DESCRIPTION OF THE DRAWINGS

FIG. 1 is a schematic side view of a terminating arrangement according to an embodiment of the present invention;

FIG. 2 is a schematic cross-sectional view of the terminating arrangement illustrated in FIG. 1 along the cross-sectional line A-A depicted in FIG. 1;

DETAILED DESCRIPTION OF THE DRAWINGS

Figure 3:
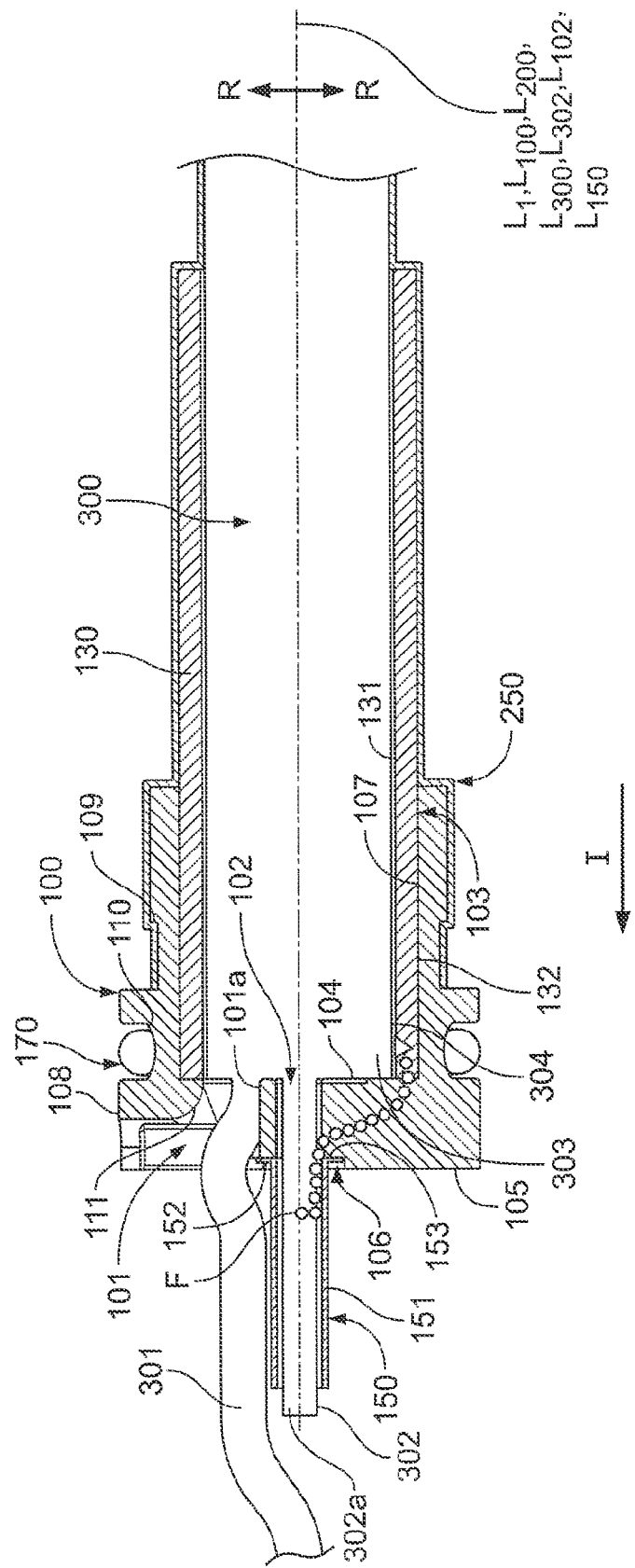
FIG. 3 is a detail X marked in FIG. 2 of the terminating arrangement shown therein.

FIG. 1 is a schematic side view of a terminating arrangement 1 according to an embodiment of the present invention. The terminating arrangement comprises an anchor body in the form of an end cap 100 and an enclosure assembly 200 for terminating a transmission cable 300. Further, the terminating arrangement 1 may comprise a connector 400 for terminating a transmission line 301 of the cable 300. The terminating arrangement 1 is arranged such that a longitudinal axis L100 of the end cap 100, a longitudinal axis L200 of the enclosure assembly 200, a longitudinal axis L300 of the cable 300 and a longitudinal axis L302 of a strength member 302 of the cable 300 are superimposed upon each other and thereby constitute a common longitudinal axis L1 of the terminating arrangement 1.

FIG. 2 is a schematic cross-sectional view of the terminating arrangement 1 along the cross-sectional line A-A illustrated in FIG. 1, i.e. the longitudinal axis L1 of the terminating arrangement 1. The cable 300 has been inserted into the enclosure assembly 200 in an insertion direction I so that it passes through the enclosure assembly 200 and is inserted into the end cap 100. The line 301 has been inserted into a lead-through opening 101 of the end cap in the insertion direction I. The strength member 302 of the cable 300 has been inserted into a passage 102 of the end cap 100.

A ferrule 150 is crimped to a section of the strength member 302 extending beyond the passage 102 in the insertion direction I.

In a pre-assembled state P of the terminating arrangement 1 shown in FIG. 2, the end cap 100 is fixed to the optical fibre cable in that the ferrule 150 prevents movements of the strength member 302 and thereby the cable 300 opposite to the insertion direction I. The end cap 100 may be pulled back, i.e. opposite to the insertion direction I with respect to the enclosure assembly 200 so that it is inserted into an inner space 201 of the enclosure assembly 200 in order to be snugly circumferentially surrounded by an inner circumference 202 of the inner space 201. The terminating arrangement 1 is then in a final state Q (not shown), where the end cap 100 is protectively held within the enclosure assembly 200.

FIG. 3 is a schematic cross-sectional view of the end cap 100 accommodating the cable 200 (Detail 3 marked in FIG. 2). An end section 303 of the cable 300 is held within a receptacle 103 of the end cap 100 so that it may abut a rear side 104 of the end cap 100 in the insertion direction I. The rear side 104 may be formed by a bottom of the receptacle 103. The line 301 and the strength member 302 extend through the lead-through opening 101 and the passage 102, respectively, from the rear side 104 to a front side 105 of the end cap 100.

A socket 106 is formed at the front side 105 of the end cap 100 and at least partly accommodates the ferrule 150 encompassing a free end 302a of the strength member 302 jutting above the front side 105 in the insertion direction I. The ferrule 150 is provided with a tubular section 151 to be crimped to the free end 302 and further with a collar 152 forming an abutment face 153 for supporting the ferrule within the socket 106. Hence, the end cap 100 is jammed between the end section 303 and the ferrule 150.

The end section 303 may be held within a tubular bushing 130 in that an inner circumference 131 of the bushing may be encompassed by an outer circumference 304 of the cable 300. An outer circumference 132 of the bushing 130 may be encompassed by an inner circumference 107 of the receptacle 103. The bushing 130 may be press-fitted into the receptacle 103 before inserting the cable 300. The bushing 130 may be a part of the receptacle 103 and may be integrally formed with the end cap 100.

A force flux F of a retention force for providing strain relief extends from the free end 302a of the strength member 302 via the ferrule 150 to the front side 105 and/or the socket 106 and from there radially outwardly through the end cap 100 to the receptacle 103, which transfers the flux F to the end section 303 of the cable 300, in particular to the outer circumference 304 of the cable 300. If the bushing 130 is provided as a separate part, the force flux F is transferred from the inner circumference 107 of the receptacle 103 to the outer circumference 132 of the bushing 130 and then via the inner circumference 131 of the bushing 130 to the outer circumference 304 of the end section 303 of the cable. In other words, retention forces are transferred from the strength member 302 via the ferrule 150, end cap 100 and bushing 130 to the outer circumference 304 of the cable 300, wherein the outer circumference 304 may be formed by a sheath of the cable 300.

Further, a shrink-on tube 250 may surround the outer circumference 304 of the cable 300, the outer circumference 132 of the bushing 130 and an outer circumference 108 of the end cap 100 and in particular the receptacle 103 in order to seal up and affix the end section 303 of the cable 300 within the receptacle 103. For enhancing the grip of the shrink-on tube 250 along the outer circumference 108 of the end cap 100 and especially for preventing movements of the shrink-on tube 250 opposite to the insertion direction I, the outer circumference 108 may be provided with a circumferential step 109 so that the diameter of the outer circumference 108 is decreased and an edge is formed where the shrink-on tube 250 is supported opposite to the insertion direction I.

For sealing up between the end cap 100 and the enclosure assembly 200, in particular the outer circumference 108 of the end cap 100 and the inner circumference 202 of the enclosure assembly 200, a sealing element 170 in the form of an O-ring may be provided. The sealing element 170 may be placed within a circumferential groove 110 extending along the outer circumference 108 of the end cap 100.

Moreover, in FIG. 3 it becomes apparent that the lead-through opening 101 is provided with a curvature 111 so that the lead-through opening 101 partly extends in a radial direction R of the end cap 100 and thereby away from the passage 102. Hence, if viewed along the insertion direction I, the lead-through opening 101 of the rear face 104 initially extends in parallel to the passage 102 extending along the longitudinal axis L100. Towards the front face 105, the lead-through opening 101 is curved away from the passage 102.

Figure 4:
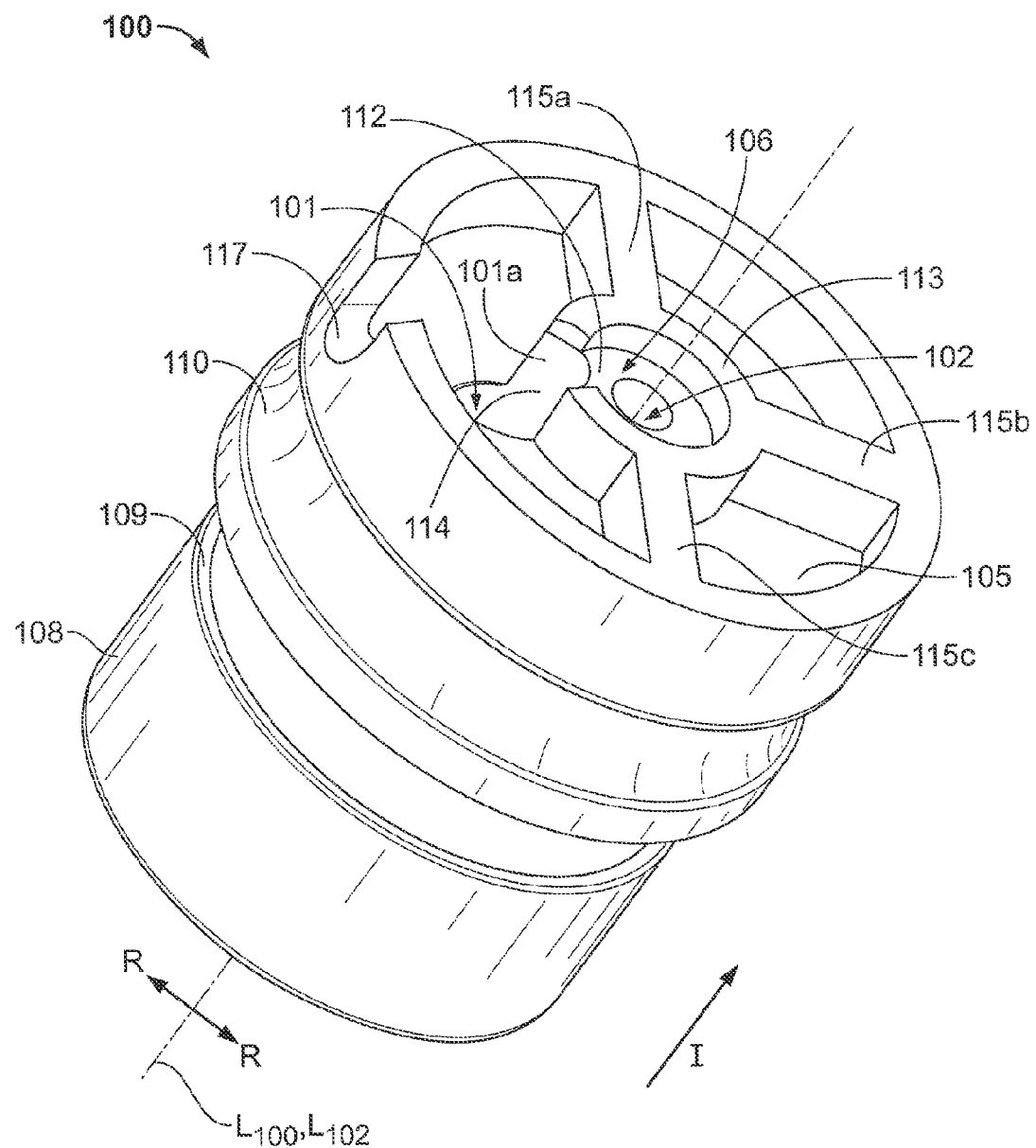
FIG. 4 is a schematic perspective view of an end cap according to an embodiment of the present invention.

FIG. 4 shows a schematic perspective view of the end cap 100. Here it becomes apparent that the socket 106 protrudes from the front face 105 in the insertion direction I. A bottom 112 of the socket 106 is formed to support the ferrule 150 and in particular the abutment face 153 provided by the collar 152 of the ferrule 150. A rim 130 circumferentially surrounds the socket 106. A cut-out 114 in the rim 113 and partly in the bottom 112 of the socket 106 provides that a straight section 101a of the wall of the lead-through opening 101 extending essentially in parallel to the longitudinal axis L100 allows the line 301 to be pushed easily through the lead-through opening 101 in the insertion direction I without any edges which could constitute obstacles.

Further, three webs 115a, 115b and 115c extend radially away from the socket 106 and merge with the rim 113 so that the socket is laterally supported by the webs 115a-c. The webs 115a-c merge with a collar 116 circumferentially surrounding the front face 105. A gap 117 in the collar 116 is provided in the vicinity of the lead-through opening 101.

Deviations from the above-described embodiments are possible within the inventive idea. A terminating arrangement 1 may comprise end caps 100, bushings 130, ferrules 150, sealing elements 170, enclosure assemblies 200, shrink-on tubes 250, cables 300 and/or connectors 400 in whatever number and form desired for a specific application.

The end cap 100 may be provided with lead-through openings 101 and passages 102 forming channels for lines 301 and strength members 302, respectively, in any number and form required. The rear face 104 and the front face 105 may be formed as desired and provided with receptacles 103 and sockets 106, respectively, in any form and number desired for supporting and accommodating bushings 130, end sections 303 of cables 300 and ferrules 150, respectively. The inner circumference 107 of the receptacle may be adapted as required for receiving a bushing 130 and/or cables 300 in a complementary manner. The outer circumference 108 of the end cap 100 may be provided with steps 109 and grooves 110 in any form and number required for attaching sealing elements 170 and/or shrink-on tubes 250, respectively, in a positive fit manner.

Lead-through openings 101 may be provided with curvatures 111 in order to allow for an easy handling of a line 301.

The form of the lead-through opening 101 and the curvature 111 may be chosen and matched to any cut-outs 114 and gaps 117 in order to enable secure and easy handling of the line 301 next to a free end 302a of the strength member 302. The socket 106 may be provided with bottoms 112, rims 113 and cut-outs 114 in any form and number required for supporting a ferrule 150.

Webs 115a-c may be provided in any form and number required and may merge with the rim 130 and the collar 106 in order to stabilize the socket 106 and/or the collar 116 as well as to guide a tool to be applied to the free end 302a of the strength member 302. Therefore, surfaces of the rim 113, the webs 115a-c and/or the collar 116 facing in the insertion direction I may be aligned to each other such that they define a plane along which a tool may be moved when applied to the free end 302a of the strength member 302 and/or the ferrule 150.

The bushing 130 may be formed as required for providing an inner circumference 131 adapted to snugly encompass the outer circumference 304 of the cable 300 as well as for providing an outer circumference 132 in order to snugly accommodate the bushing 130 within the receptacle 103. The bushing 130 may be integrally formed with the receptacle 103 or may be fitted thereto. The ferrule 150 may be provided with a tubular section 151 and a collar 152 in whatever form required and may be integrally formed with the end cap 100 or may be attached thereto.

The enclosure assembly 200 may be provided an inner spacer 201 in whatever form and shape required for accommodating at least one end cap 100 as well as at least one cable 300. The cable 300 may include lines 301 in whatever form and number required for a certain application as well as strength members 302. The cable 300 may be any kind of transmission cable for transmitting information, e.g. digital data and/or analog signals, as well as electrical power. Hence, the line 301 may be any transmission line for transmitting information and/or electrical power. Therefore, the line may comprise any kind of electrical conductor, such as braided or stranded wires made of metal, e.g. copper. The line 301 may also be any transmission line in the form of an optical fibre or bundle of optical fibres.

REFERENCE SIGNS LIST

| No. | Part | No. | Part |
|---|---|---|---|
| 1 | terminating arrangement | I | insertion direction |
| | | R | radial direction |
| 100 | end cap | | |
| 101 | lead-though opening | | |
| 101a | straight section | $L_1$ | longitudinal axis of terminating arrangement |
| 102 | passage | $L_{100}$ | longitudinal axis of end cap |
| 103 | receptacle | $L_{102}$ | longitudinal axis of passage |
| 104 | rear side | $L_{150}$ | longitudinal axis of ferrule |
| 105 | front side | $L_{200}$ | longitudinal axis of enclosure assembly |
| 106 | socket | $L_{300}$ | longitudinal axis of cable |
| 107 | inner circumference of receptacle | $L_{302}$ | longitudinal axis of strength member |
| 108 | outer circumference of receptacle | | |
| 109 | step | | |
| 110 | groove | P | pre-assembled state |
| 111 | curvature | Q | final state |
| 112 | bottom of socket | | |
| 113 | rim of socket | F | force flux |

-continued

| No. | Part | No. | Part |
|---|---|---|---|
| 114 | cut-out | | |
| 115a, 115b, 115c | webs | | |
| 116 | collar | | |
| 117 | gap | | |
| 130 | bushing | | |
| 131 | inner circumference | | |
| 132 | outer circumference | | |
| 150 | ferrule | | |
| 151 | tubular section | | |
| 152 | collar | | |
| 153 | abutment face | | |
| 170 | sealing element | | |
| 200 | enclosure assembly | | |
| 201 | inner space | | |
| 202 | inner circumference | | |
| 250 | shrink-on tube | | |
| 300 | transmission cable | | |
| 301 | transmission line | | |
| 302 | strength member | | |
| 302a | free end of strength member | | |
| 303 | end section | | |
| 304 | outer circumference | | |
| 400 | connector | | |

What is claimed is:

1. A terminating arrangement comprising:
a cable including a transmission line, and a strength member surrounded by a jacket;
a connector at which the transmission line is terminated, the connector including a connector housing;
an anchor body having an inner opening configured to receive an end of the jacket, and a passage that receives the strength member so that the strength member of the cable extends beyond the jacket and anchors to the anchor body, the diameter of the passage being smaller than the diameter of the cable, the anchor body being separate from the connector housing and being coupled to the connector only via the transmission line; and
an enclosure assembly defining an inner space in which the anchor body can be sealingly disposed.

2. The terminating arrangement of claim 1, further comprising a sealing element disposed between the anchor body and the enclosure assembly.

3. The terminating arrangement of claim 2, wherein the sealing element includes an O-ring.

4. The terminating arrangement of claim 2, wherein the anchor body defines a circumferential groove in which the sealing element is disposed.

5. The terminating arrangement of claim 1, wherein the anchor body includes a bushing that surrounds the end of the cable.

6. The terminating arrangement of claim 5, wherein the bushing is integral with the anchor body.

7. The terminating arrangement of claim 5, further comprising a shrink-on tube that surrounds an outer circumference of the cable, an outer circumference of the bushing, and an outer circumference of the anchor body.

8. The terminating arrangement of claim 1, wherein the anchor body includes a ferrule to which the strength member is fixed.

9. The terminating arrangement of claim 8, wherein the ferrule is crimped to the anchor body.

10. The terminating arrangement of claim 1, wherein the strength member is a central strength member of the cable.

11. The terminating arrangement of claim 1, wherein the anchor body extends from a first end to a second end, the first end being open and defining the inner opening, the second end being substantially closed, the second end defining a through-opening sized to receive the transmission line.

12. The terminating arrangement of claim 11, wherein the through-opening is offset from a central longitudinal axis of the anchor body.

13. The terminating arrangement of claim 11, wherein the through-opening is provided with a curvature so that the through-opening partly extends in a radial direction of the anchor body.

14. The terminating arrangement of claim 1, wherein the passage extends along a central longitudinal axis of the anchor body.

15. The terminating arrangement of claim 11, wherein the anchor body carries an external sealing element.

16. The terminating arrangement of claim 15, wherein the anchor body carries a bushing so that the anchor body extends between the bushing and the sealing element.

17. The terminating arrangement of claim 1, wherein the transmission line of the cable includes an optical fiber.

18. The terminating arrangement of claim 1, wherein the transmission line of the cable includes an electrical conductor.

19. The terminating arrangement of claim 1, wherein the enclosure assembly includes an outer body and an inner body.

* * * * *